(12) United States Patent
Chen et al.

(10) Patent No.: US 10,295,766 B2
(45) Date of Patent: May 21, 2019

(54) OPTICAL MODULE

(71) Applicants: HISENSE BROADBAND MULTIMEDIA TECHNOLOGIES CO., LTD, Qingdao OT (CN); HISENSE BROADBAND MULTIMEDIA TECHNOLOGIES, LTD., Road Town OT (VG)

(72) Inventors: Biao Chen, Qingdao (CN); Liuyin Yang, Qingdao (CN)

(73) Assignee: HISENSE BROADBAND MULTIMEDIA TECHNOLOGIES CO., LTD., Tortola (VG)

( * ) Notice: Subject to any disclaimer, the term of this patent is extended or adjusted under 35 U.S.C. 154(b) by 0 days.

(21) Appl. No.: 15/394,757

(22) Filed: Dec. 29, 2016

(65) Prior Publication Data

US 2017/0336583 A1 Nov. 23, 2017

(30) Foreign Application Priority Data

May 17, 2016 (CN) .......................... 2016 1 0327238

(51) Int. Cl.
  *G02B 6/42* (2006.01)
  *G02B 6/38* (2006.01)
  *H04B 10/40* (2013.01)
  *H04B 10/50* (2013.01)
  *H04B 10/60* (2013.01)

(52) U.S. Cl.
  CPC .......... *G02B 6/4269* (2013.01); *G02B 6/387* (2013.01); *G02B 6/4246* (2013.01); *G02B 6/4256* (2013.01); *H04B 10/40* (2013.01); *H04B 10/50* (2013.01); *H04B 10/60* (2013.01)

(58) Field of Classification Search
  CPC .... G02B 6/4269; G02B 6/387; G02B 6/4246; G02B 6/4256; H04B 10/40; H04B 10/50; H04B 10/60
  See application file for complete search history.

(56) References Cited

U.S. PATENT DOCUMENTS

| | | | |
|---|---|---|---|
| 5,596,663 A * | 1/1997 | Ishibashi | G02B 6/4246 361/785 |
| 5,793,540 A * | 8/1998 | Ohtsuki | G02B 7/023 359/811 |
| 6,490,303 B1 * | 12/2002 | Komiyama | H01S 5/02216 359/819 |
| 6,937,385 B2 * | 8/2005 | Bennett | G02B 6/12004 359/333 |

(Continued)

FOREIGN PATENT DOCUMENTS

| CN | 205232234 U | 5/2016 |
|---|---|---|
| WO | WO 2014/019508 A1 | 2/2014 |

OTHER PUBLICATIONS

The Chinese First Examination Report of corresponding China patent application No. 201610327238.4, dated Nov. 10, 2017.

*Primary Examiner* — Peter Radkowski
(74) *Attorney, Agent, or Firm* — Brinks Gilson & Lione

(57) ABSTRACT

The present disclosure provides an optical module, including: an optical sub-module and a first housing; where a first sub-surface of the optical sub-module is provided with a first boss, and the first housing is provided with a first opening corresponding to the first boss. The improved structure of the optical module can greatly increase heat conduction efficiency of the optical module.

20 Claims, 9 Drawing Sheets

(56) References Cited

U.S. PATENT DOCUMENTS

| | | | | |
|---|---|---|---|---|
| 6,986,679 B1* | 1/2006 | Aronson | H01R 25/00 | |
| | | | 439/170 | |
| 7,137,744 B2* | 11/2006 | Wang | G02B 6/4201 | |
| | | | 385/89 | |
| 7,787,004 B2* | 8/2010 | Nomura | B41J 2/45 | |
| | | | 347/238 | |
| 8,047,856 B2* | 11/2011 | McColloch | G02B 6/3885 | |
| | | | 439/331 | |
| 8,186,891 B2* | 5/2012 | Hudgins | H04B 10/075 | |
| | | | 385/92 | |
| 8,202,011 B2* | 6/2012 | Moore | G02B 6/4201 | |
| | | | 385/88 | |
| 8,485,739 B2* | 7/2013 | Yi | G02B 6/4269 | |
| | | | 385/92 | |
| 8,609,445 B2* | 12/2013 | Kanemoto | G02B 6/4201 | |
| | | | 359/344 | |
| 9,122,025 B2* | 9/2015 | Ishikawa | G02B 6/4292 | |
| 9,608,402 B2* | 3/2017 | Gao | H01S 5/02212 | |
| 2003/0021311 A1* | 1/2003 | Tsunetomo | H01S 5/02284 | |
| | | | 372/36 | |
| 2003/0169982 A1* | 9/2003 | Amorim | G02B 6/4201 | |
| | | | 385/92 | |
| 2003/0185518 A1* | 10/2003 | Bennett | G02B 6/12004 | |
| | | | 385/53 | |
| 2004/0247240 A1* | 12/2004 | Teramura | G02B 6/4226 | |
| | | | 385/27 | |
| 2004/0264538 A1* | 12/2004 | Namiwaka | H01S 5/02284 | |
| | | | 372/50.1 | |
| 2005/0276547 A1* | 12/2005 | Wang | G02B 6/4201 | |
| | | | 385/92 | |
| 2008/0189726 A1* | 8/2008 | Kinoshita | G11B 7/1378 | |
| | | | 720/681 | |
| 2009/0123157 A1* | 5/2009 | Moore | G02B 6/4201 | |
| | | | 398/135 | |
| 2009/0220248 A1* | 9/2009 | Hudgins | H04B 10/075 | |
| | | | 398/183 | |
| 2011/0207344 A1* | 8/2011 | McColloch | G02B 6/3885 | |
| | | | 439/78 | |
| 2012/0251057 A1* | 10/2012 | Yi | G02B 6/4246 | |
| | | | 385/92 | |
| 2013/0011104 A1* | 1/2013 | Sato | G02B 6/4244 | |
| | | | 385/93 | |
| 2014/0233897 A1* | 8/2014 | Ishikawa | G02B 6/4292 | |
| | | | 385/93 | |
| 2015/0338602 A1* | 11/2015 | Furutake | G02B 7/021 | |
| | | | 359/793 | |
| 2016/0276802 A1* | 9/2016 | Gao | H01S 5/02212 | |

* cited by examiner

OPTICAL MODULE

CROSS REFERENCE TO RELATED APPLICATION

This application claims the benefit of priority from Chinese Patent Application No. 201610327238.4, entitled "Optical Module", and filed on May 17, 2016 to the Chinese Patent Office, the entire contents of which are hereby incorporated by reference.

TECHNICAL FIELD

The present disclosure relates to optical communication technologies and more particularly to an optical module.

BACKGROUND

The optical module is mainly used for photoelectric conversion. A transmitting end of the optical module converts an electrical signal into an optical signal and transmits it through an optical fiber. A receiving end of the optical module converts a received optical signal into an electrical signal. During the photoelectric conversion, the optical module will generate heat. If the heat generated by the optical module is not dissipated in time, normal operations of the optical module will be affected.

A component having the maximum heat generation in the optical module is a transmitting optical sub-assembly (TOSA). In the prior art, the main heat dissipation method of the optical module is: placing a thermal adhesive on both of the upper and lower surfaces of the TOSA. During the operations of the optical module, the heat generated by the TOSA is transmitted to a housing of the optical module via the thermal adhesive, then to a cage of the optical module via the housing of the optical module, and at last dissipated by the cage and the heat sinks on the cage.

However, the heat dissipation method used in the prior art optical module has a low efficiency in thermal conduction, and when the optical module is operated in a high-temperature environment for a long time, the utilization of optical module in the prior art will lead to an untimely heat dissipation, resulting in a rapid aging of internal circuits of the optical module and inactivation of the optical module.

SUMMARY

Embodiments of the present disclosure provide an optical module for solving the problem of low efficiency in the heat conduction of the optical module.

In a first aspect, embodiments of the present disclosure provides an optical module, including:

an optical sub-module and a first housing;

wherein a first surface of the optical sub-module is provided with a first boss; and the first housing is provided with a first opening corresponding to the first boss, and the first boss can be embedded into the first opening.

In a second aspect, embodiments of the present disclosure provides an optical module, including: a first optical sub-module, a second optical sub-module and a first housing;

wherein, a first surface of the first optical sub-module is provided with a first boss and a first surface of the second optical sub-module is provided with a second boss;

the first housing is provided with a first opening corresponding to the first boss and a second opening corresponding to the second boss, the first boss can be embedded into the first opening, and the second boss can be embedded into the second opening;

the first optical sub-module and the second optical sub-module are snap-connected.

According to the optical module of the embodiments of the present disclosure, a boss is set on the flat surface of the optical sub-module, allowing a larger contact area between the boss and the optical sub-module and resulting in more heat absorption and better heat dissipation after the heat generation of the optical sub-module. At the same time, the opening of the housing of optical module corresponding to the boss enables the boss to be embedded into the opening, leading to a larger contact area with the housing of optical module. Following the heat generation of the optical sub-module, the boss will absorb the heat and transfer the heat to the housing quickly, and then to the external cage via the housing, thus realizing a quick heat dissipation. The improved structure of the optical module in the embodiments of the disclosure makes a great increase in heat conduction efficiency; hereby the inactivation of the optical module due to the untimely heat dissipation will not appear even if the optical module is operated in a severe environment.

DESCRIPTION OF EMBODIMENTS

The embodiments of the present disclosure will now be described clearly and completely in conjunction with the following accompanying drawings. It is obvious that the described embodiments are just some embodiments of the present disclosure, but not all the embodiments. According to the embodiments of the present disclosure, all embodiments obtained by those skilled in the art without making any creative work are within the scope of the protection of the present disclosure.

Figure 1:
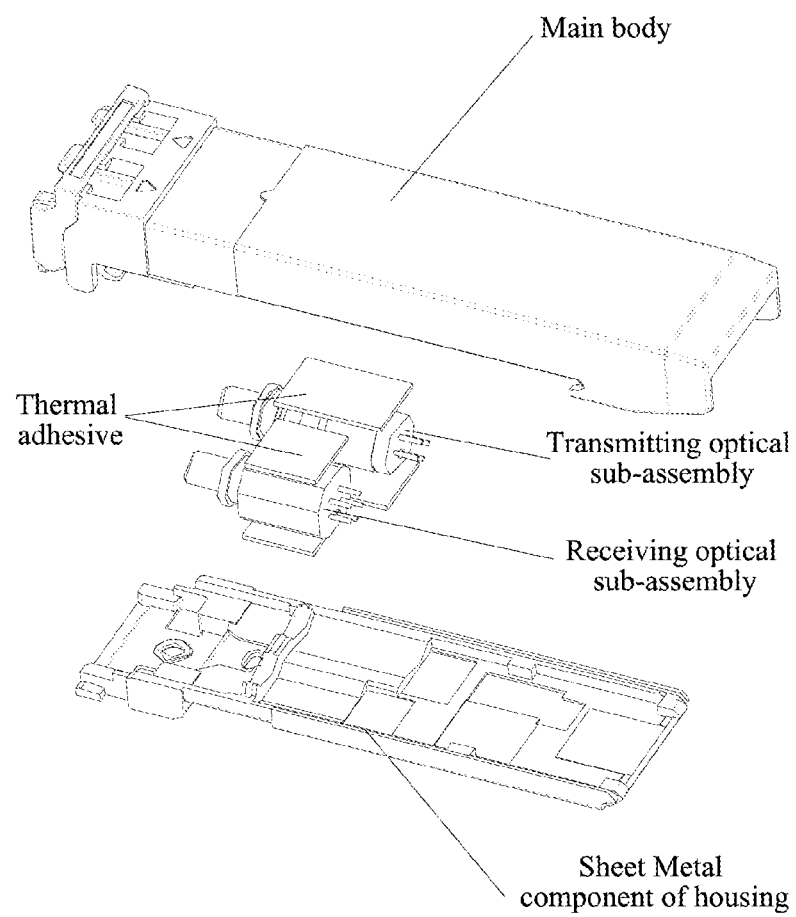
FIG. 1 is an exploded view of an optical module.

FIG. 1 is an exploded view of an optical module. As shown in FIG. 1, the upper surface of the main body of the optical module is a closed structure, and sheet metal component of the lower surface of the main body of the optical module also form a closed structure. A surface of an optical sub-module in the optical module is an arc-shaped surface, and thermal adhesive is applied on the arc-shaped surface of the optical sub-module. During the operation of the optical module, the thermal adhesive absorbs the heat generated by the TOSA and the receiving optical sub-assembly (ROSA), and transfers the heat to the upper surface of the main body of the optical module and then to the cage where the optical module is located. Such a heat dissipation will lead to, on the one hand, a low thermal conductivity, and on the other hand, a problem of oil leakage, aging and inactivation of the used thermal adhesive, thereby resulting an unsatisfactory heat dissipation effect of the optical module. With continuous developments of optical transmission technologies, the optical module is used more and more widely. However, in many application scenarios, the internal components of the optical module will generate high heat, thereby causing the problem of aggravated aging of the internal circuits and inactivation of the optical module due to the untimely heat dissipation.

The embodiments of the present disclosure propose a new optical module based on the above problem. The heat dissipation efficiency of the optical module is enhanced by improving the structure of the optical module, thus protecting the optical module and prolonging the service time of the optical module.

Figure 2:
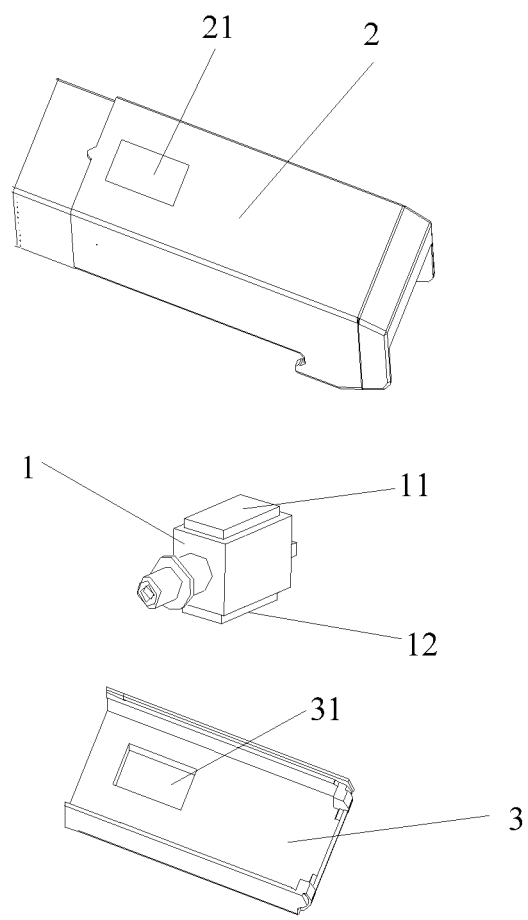
FIG. 2 is an exploded structural view of an optical module provided by some embodiments of the present disclosure.

FIG. 2 is an exploded structural view of an optical module provided by some embodiments of the present disclosure. As shown in FIG. 1, the optical module includes an optical sub-module 1 and a first housing 2.

The first housing 2 is a portion where the upper surface of the main body of the optical module is located.

A first surface of the optical sub-module 1 is a flat surface.

The first surface of the optical sub-module 1 is provided with a first boss 11.

The first housing 2 is provided with a first opening 21 corresponding to the first boss 11, and the first boss 11 can be embedded into the first opening 21.

The first opening 21 may be a through opening or blind opening as long as the first boss 11 can be embedded therein. The other openings described in the embodiments of the present disclosure may also be through openings or blind openings, which will not be repeated below.

Optionally, the shape of the first opening 21 is the same as that of the first boss 11, and the size of the first opening 21 is matched to that of the first boss 11, hereby allowing a maximum contact area between the first boss 11 and the first housing 2.

In the above-mentioned optical module, the optical sub-module 1 is provided with a boss on the surface thereof, and the opening is provided on the housing of optical module at a position corresponding to the boss, such that the boss can be embedded into the opening in the assembly process of the optical module. Such a design will not increase the overall height and width of the optical module, that is to say, will not affect the joint of the optical module to the external equipments. Meanwhile, the boss is embedded into the housing of optical module. When the optical sub-module generates heat the generated heat will be absorbed by the boss from the optical sub-module quickly, transferred to the housing of optical module via multiple surfaces of the boss, transferred to the cage via the housing of optical module, thus completing the rapid heat dissipation process.

As described above, the area of the boss should be smaller than the area of the upper surface and the area of the lower surface of the optical sub-module, and under this condition, the larger the area of the boss is, the better the heat dissipation effect is.

The optical sub-module 1 may be a TOSA, a ROSA or a transceiving optical sub-assembly.

In the embodiments of the present disclosure, a boss is provided on the flat surface of the optical sub-module, and an opening is provided on the housing of optical module at a position corresponding to the boss such that the boss can be embedded into the opening. Since the boss is set on the flat surface of the optical sub-module, the contact area between the boss and the optical sub-module is larger, thereby allowing greater heat absorbance by the boss and better heat dissipation effect after the heat generation of the optical sub-module. Further, since the boss is embedded into the opening of the housing, which is to say, the contact area with the housing is large, the heat will be easily transferred to the housing, and then to the external cage via the housing, thus realizing the rapid heat dissipation of the optical module. The improved structure of the optical module in the embodiments of the present disclosure allows a greatly increased heat conduction efficiency of the optical module, thereby avoiding the inactivation of the optical module caused by the untimely heat dissipation even under the severe working conditions. Furthermore, when the boss is embedded into the housing, a metal closed space will be formed in the optical module in up and down directions, thereby preventing the electromagnetic wave inside the optical module from leaking out of the optical sub-module in up and down directions.

In other embodiments, referring to FIG. 1, the optical module further includes a second housing 3.

The second housing 3 is a portion where the lower and side surfaces of the main body of the optical module are located, i.e., the first housing 2 is the housing of the upper portion of the optical module, and the second housing 3 is a U-shaped housing of the lower portion of the optical module. The first housing 2 and the second housing 3 are tightly connected after assembly, resulting in that the components of the optical module are wrapped therein.

A second surface of the optical sub-module 1 is provided with a second boss 12.

The first surface is the upper surface of the optical sub-module 1, and the second surface is the lower surface of the optical sub-module 1. That is, the upper and lower surfaces of the optical sub-module are each provided with a boss an area of which is smaller than the area of the upper surface and lower surface.

A first surface of the second housing 3 is provided with a second opening 31 corresponding to the second boss 12 which can be embedded into the second opening 31.

Optionally, the shape of the second opening 31 is the same as that of the second boss 12, and the size of the second opening 31 is matched to that of the second boss 12.

A second surface of the second housing 3 and a third surface of the optical sub-module 1 are snap-connected. The second surface of the second housing 3 is vertically connected to the first surface of the second housing 3, and the third surface of the optical sub-module 1 is respectively vertically connected to the first surface and the second surface of the optical sub-module 1.

Figure 3:
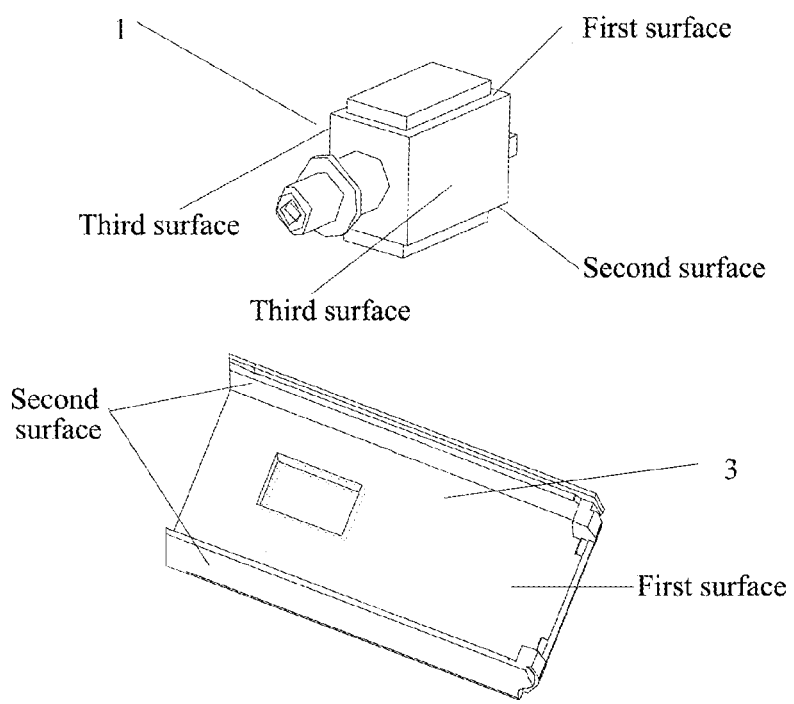
FIG. 3 is a view of each surface of an optical sub-module and a second housing.

As described above, the second housing 3 is the portion where the lower and side surfaces of the main body of the optical module located, where the first surface of the second housing 3 is the lower surface of the main body of the optical module. The second surfaces of the second housing 3 refer to the two side surfaces of the main body of the optical module and the third surfaces of the optical sub-module 1 refer to the two side surfaces which are in contact with the second surfaces of the second housing 3. FIG. 3 is a view of each surface of an optical sub-module and a second housing. According to the FIG. 3, the two side surfaces of the optical sub-module 1 and the two side surfaces of the second housing 3 are formed to be snap-connected, for example, via a groove and a protrusion, or via a circular opening and a cylinder. By snap-connecting the side surfaces of the optical sub-module to the side surfaces of the housing, a closed metal barrier may be formed on the side surfaces of the optical module, hereby prevent the electromagnetic wave inside the optical module from leaking out from the optical port.

It should be noted that, if the optical sub-module in the optical module refers to the TOSA and the ROSA, that means, the third surfaces of the optical sub-module 1, which are snap-connected to the second surfaces of the second housing 3, specifically refer to one side surface of the TOSA that is in contact with the second housing 3, and one side surface of the ROSA that is in contact with the second housing 3.

In an optional implementation, a snap-connection is formed between the optical sub-module and the second housing by means of a groove and a protrusion. This can be achieved in either of the following two ways:

(1) A groove is provided on the second surface of the second housing 3, and a protrusion matching with the groove is provided on the third surface of the optical sub-module 1, such that the second surface of the second housing 3 and the third surface of the optical sub-module 1 are snap-connected.

Optionally, the length of the groove coincides with the height of the second surface of the second housing 3, and the length of the protrusion coincides with the height of the third surface of the optical sub-module 1.

In addition, the number of the grooves may be two, and the number of the protrusions also may be two.

(2) The second surface of the second housing 3 is provided with a protrusion, and the third surface of the optical sub-module 1 is provided with a groove matching with the protrusion, such that the second surface of second housing 3 and the third surface of the optical sub-module 1 are snap-connected.

Optionally, the length of the protrusion coincides with the height of the second surface of the second housing 3, and the length of the groove coincides with the height of the third surface of the optical sub-module 1.

In addition, the number of the above grooves may be two, and the number of the protrusions also may be two.

Furthermore, the second surfaces of the second housing 3 may have a protrusion on one side surface and a groove on the other side surface, and, correspondingly, the third surfaces of the optical sub-module 1 may have a groove on one side surface and a protrusion on the other side surface. In brief, as long as the second housing and the optical sub-module form a snap-connection, a flexible setting can be made as required.

Figure 4:
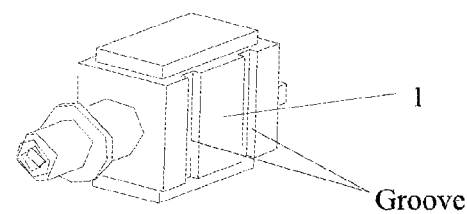
FIG. 4 is a schematic view of a second mode.
Figure 4:
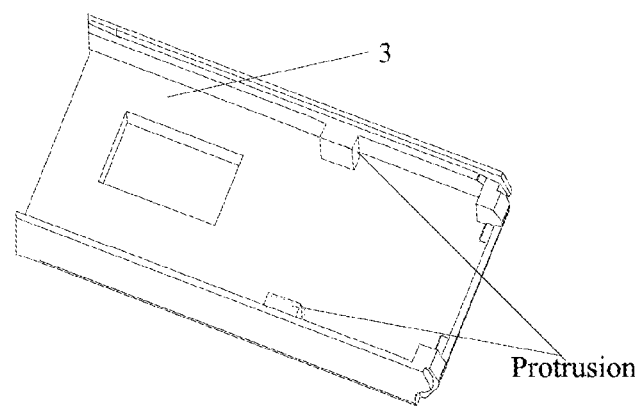
Figure 5:
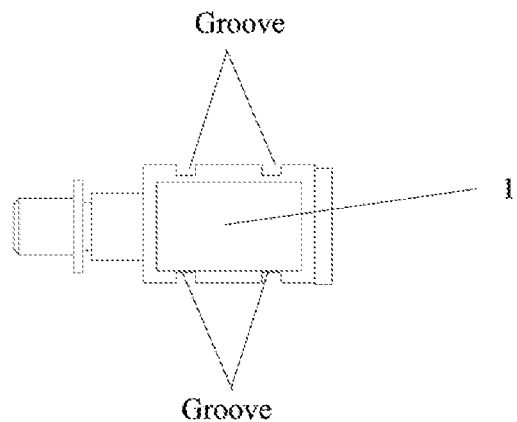
FIG. 5 is a top view of the optical sub-module in the second mode.

FIG. 4 is a schematic view of a second mode; FIG. 5 is a top view of the optical sub-module in the second mode. As shown in FIGS. 4 and 5, the third surface of the optical sub-module 1 is provided with grooves, and the second surfaces of the second housing 3 is provided with the protrusions, where the number of the grooves is equal to that of the protrusions, and their sizes are matched with each other, thereby realizing a snap-connection after the assembly of the optical module, forming a closed metal barrier on the sides of the optical module, and avoiding electromagnetic waves inside the optical module leaking from the optical port.

Based on the above-described embodiments, the shapes of the above-mentioned optical sub-module 1, the first boss 11, the second boss 12, the first opening 21, and the second opening 31 are rectangular in an optional implementation.

In the embodiments of the present disclosure, the shape of the optical sub-module is set to rectangle. Comparing with the optical sub-module in other shapes, the rectangular boss providing on the rectangular optical sub-module leads to the largest contact area with the optical sub-module and the largest heat dissipation area.

In addition, the first boss 11, the second boss 12, the first opening 21, and the second opening 31 may have other shapes such as a circle, an ellipse, or the like.

Figure 6:
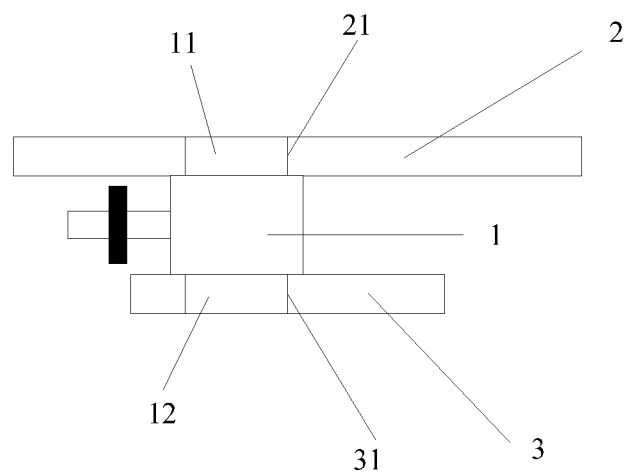
FIG. 6 is a side view of a thickness relation between a boss and a housing.

In other embodiments, the thickness of the first boss 11 is the same as that of the first housing 2, and the thickness of the second boss 12 is the same as that of the second housing 3. FIG. 6 is a side view of the thickness relation between the boss and the housing. As shown in FIG. 6, when the first boss 11 is embedded into the first opening 21 of the first housing 2, a continuous surface will be formed on the upper surface of the main body of the optical module, and when the second boss 12 is embedded into the second opening 31 of the second housing 3, a continuous surface will be formed on the lower surface of the main body of the optical module. Setting the thicknesses of the first and second bosses as described above, may allow the maximum contact area between the first boss and the first housing and the maximum contact area between the second boss and the second housing, and thus the optimum heat conduction effect. Further, a continuous surface is formed on the upper and lower surfaces of the main body in the optical module, realizing the maximum contact area between the optical module and the external cage and the optimum heat conduction effect.

In further embodiments, the optical module further includes an optical module label placed on an outer side of the first surface of the second housing 3 of the optical module. That is, the optical module label is placed on the lower surface of the main body of the optical module.

In a conventional optical module, an optical module label is usually placed on the upper surface of the optical module. Since the optical module label is generally made of a material having no thermal conductivity, if the optical module label is placed on the upper surface of the optical module, the contact area between the upper surface of the optical module and the outer cage will be affected and then the heat dissipation performance of the optical module will also be affected. However, in the embodiments of the present disclosure, the optical module label is placed on the outer side of the first surface of the second housing in the optical module, namely, the outer side of the lower surface. On the one hand, the upper surface of the optical module can make a full contact with the outer cage, thereby enhancing the heat dissipation efficiency; on the other hand, the lower surface where the optical module label is located is the area with less generated heat in the entire optical module, thus, such a setting of the optical module label will not affect the heat dissipation. Therefore, as a whole, it is possible to enhance the heat conduction efficiency of the optical module by placing the optical module label on the outer side of the first surface of the second housing in the optical module.

Figure 7:
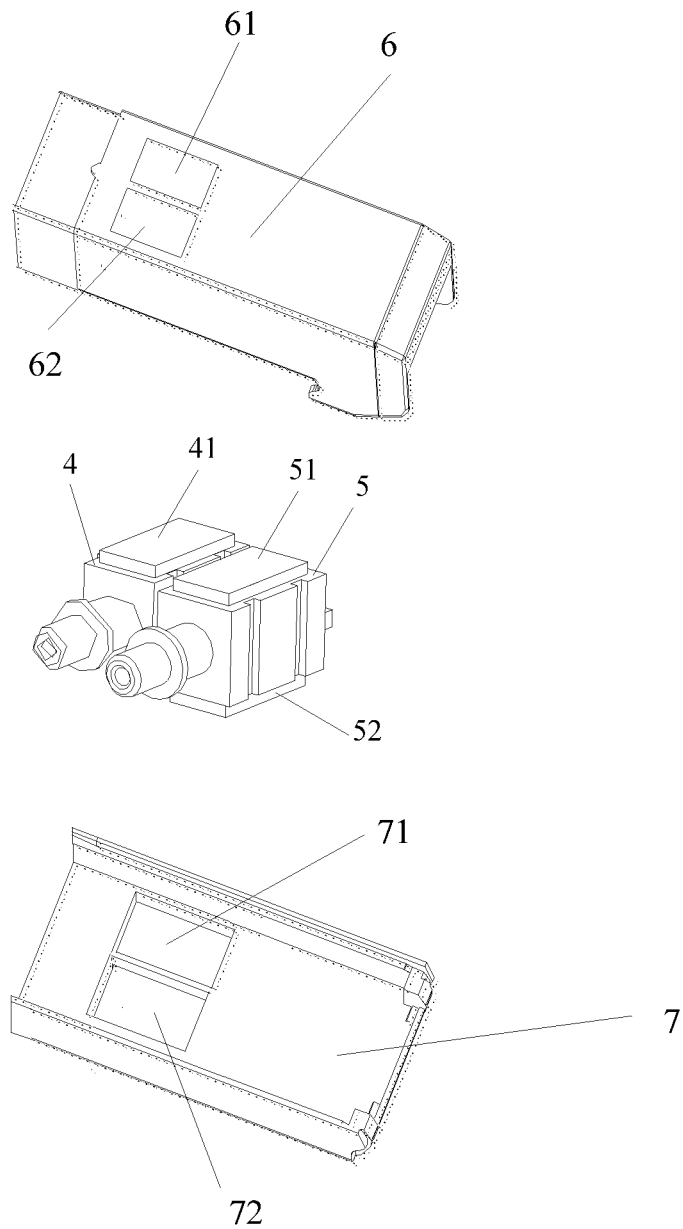
FIG. 7 is a structural view of an optical module provided in some other embodiments of the present disclosure.

FIG. 7 is a structural view of an optical module provided in some other embodiments of the present disclosure. As shown in FIG. 7, the optical module includes a first optical sub-module 4, a second optical sub-module 5, and a first housing 6.

A first surface of the first optical sub-module 4 and A first surface of the second optical sub-module 5 are flat surfaces, respectively.

A first boss 41 is provided on the first surface of the first optical sub-module 4, and a second boss 51 is provided on the first surface of the second optical sub-module 5.

The first housing 6 is provided with a first opening 61 corresponding to the first boss 41 and a second opening 62 corresponding to the second boss 51. The first boss 41 can be embedded into the first opening 61, and the second boss 51 can be embedded into the second opening 62.

Optionally, the shape of the first opening 61 is the same as that of the first boss 41, and the size of the first opening 61 is matched with that of the first boss 41. The shape of the second opening 62 is the same as that of the second boss 51, and the size of the second opening 62 is matched with that of the second boss 51.

The first optical sub-module 4 and the second optical sub-module 5 is snap-connected.

Optionally, the first optical sub-module 4 and the second optical sub-module 5 may be a TOSA and a ROSA, respectively.

In the embodiments of the present disclosure, the optical module includes two optical sub-modules, i.e., a first optical sub-module and a second optical sub-module. The upper surface of each optical sub-module is a flat surface, and each optical sub-module is provided with a boss. Openings are provided on the first housing of the optical module at positions corresponding to the bosses. On the one hand, the bosses provided on the flat surfaces can realize a maximum contact area with the optical module, thereby maximizing the heat dissipation area. On the other hand, the boss of each optical sub-module is embedded into the housing of optical module, and when the optical sub-module generates heat, the generated heat will be absorbed by the boss from the optical sub-module quickly, transferred to the housing of optical module by multiple surfaces of the boss, transferred to the cage via the housing of optical module, thus completing the rapid heat dissipation process. In addition, since the first optical sub-module and the second optical sub-module are snap-connected, a tightly connected entirety is formed by the two. During operations of the optical module, since the TOSA generates most heat and the ROSA generates relatively less heat, after the TOSA is snap-connected with the ROSA, a part of heat in the TOSA can be transferred to the ROSA, and then to the outside via the ROSA, that is, a heat dissipation way is provided for the TOSA, thereby further improving the heat dissipation efficiency of the optical module.

The area of the bosses is smaller than the area of the upper and lower surfaces of the optical sub-module, respectively, and under this condition, the larger the area of the boss is, the better the heat dissipation effect is.

Figure 8:
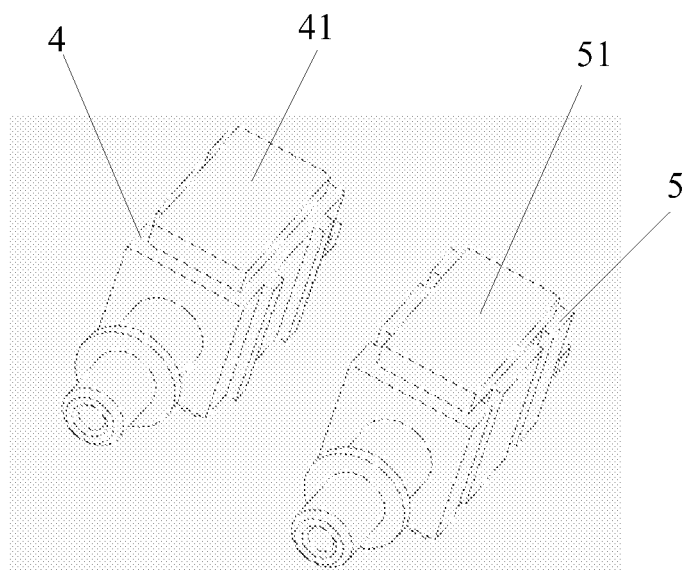
FIG. 8 is a view of a first and a second optical sub-modules with proposed setting.

In other embodiments, the first optical sub-module 4 and the second optical sub-module 5 may be specifically implemented by means of protrusions and grooves, which is:

The second surface of the first optical sub-module 4 is provided with a protrusion, and the second surface of the second optical sub-module 5 is provided with a groove, so that the first optical sub-module 4 and the second optical sub-module 5 are snap-connected. FIG. 8 is a view of a first and the second optical sub-module with the proposed setting.

Alternatively, a groove is provided on the second surface of the first optical sub-module 4, and a protrusion is provided on the second surface of the second optical sub-module 5 so that the first optical sub-module 4 and the second optical sub-module 5 are snap-connected.

It should be noted that, the meaning of each surface of the optical sub-module in the optical module shown in FIG. 7 are not the same as those shown in FIG. 2. In the optical module shown in FIG. 7, the first surface of the optical sub-module is an upper surface, the second surface is a side surface where two optical sub-modules are in contact with each other, the third surface is a lower surface, and the fourth surface is another side surface.

In other embodiments, referring to FIG. 7, the optical module further includes a second housing 7.

The second housing 7 is the portion where the lower surface and the side surfaces of the main body of the optical module are located.

A third boss (not shown) is provided on a third surface of the first optical sub-module 4, and a fourth boss 52 is provided on a third surface of the second optical sub-module 5.

The second housing 7 is provided with a third opening 71 corresponding to the third boss and a fourth opening 72 corresponding to the fourth boss 52, where the third boss can be embedded into the third opening 71, and the fourth boss 52 can be embedded into the fourth opening 72.

Optionally, the shape of the third opening 71 is the same as that of the third boss, the size of the third opening 71 is matched with the third boss, the shape of the fourth opening 72 is the same as that of the fourth boss 52, and the size of the fourth opening 72 is matched with the fourth boss 52.

The second surface of the second housing 7 is snap-connected respectively to the fourth surface of the first optical sub-module 4 and the fourth surface of the second optical sub-module 5.

Figure 9:
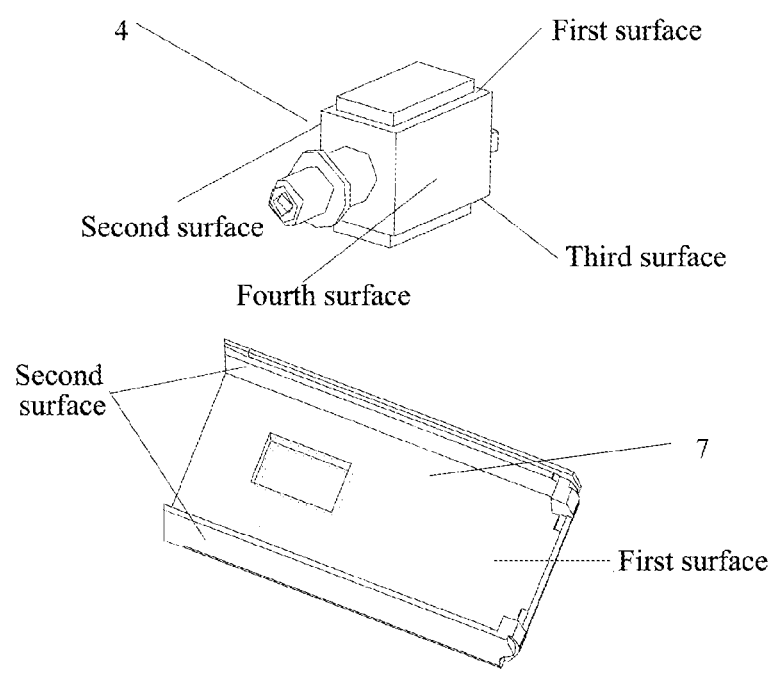
FIG. 9 is a view of each surface of the optical sub-module and the second housing of the optical module provided by further embodiments of the present disclosure.

FIG. 9 is a view of each surface of the optical sub-module and the second housing in the optical module provided by further embodiments of the present disclosure, where the first optical sub-module 4 is taken as an example to illustrate the optical sub-module in FIG. 9 and the division of each surface of the second optical sub-module 5 is the same as those of the first optical sub-module 4.

In an optional implementation, the second surface of the second housing 7 can respectively form a snap-connection with the fourth surface of the first optical sub-module 4 and the fourth surface of the second optical sub-module 5 by the grooves and protrusions. Specifically, it can be realized by either of the following two ways:

(1) The second surface of the second housing 7 is provided with grooves, meanwhile, the fourth surface of the first optical sub-module 4 and the fourth surface of the second optical sub-module 5 are respectively provided with protrusions matching with the grooves, such that the second surface of the second housing 7 can form a snap-connection with the first optical sub-module 4 and the second optical sub-module 5, respectively.

Optionally, the lengths of the above-mentioned grooves are the same as the heights of the second surface of the second housing 7, and the lengths of the above-mentioned protrusions are the same as the heights of the fourth surfaces of the first optical sub-module 4 and the second optical sub-module 5.

In addition, the number of the above-mentioned grooves may be two, and the number of the above-mentioned protrusions also may be two.

(2) The second surface of the second housing 7 is provided with protrusions, meanwhile the fourth surface of the first optical sub-module 4 and the fourth surface of the second optical sub-module 5 are respectively provided with grooves matching with the protrusions, such that the second surface of the second housing 7 can form a snap-connection with the first optical sub-module 4 and the second optical sub-module 5, respectively.

Optionally, the lengths of the above-mentioned protrusion are the same as the heights of the second surface of the second housing 7, and the lengths of the above-mentioned grooves are the same as the lengths of the fourth surfaces of the first optical sub-module 4 and the second optical sub-module 5.

In addition, the number of the above-mentioned grooves may be two, and the number of the above-mentioned protrusions also may be two.

Furthermore, the second surface of the second housing 7 may have protrusions on one side and grooves on the other side, and correspondingly, the fourth surfaces of the first optical sub-module 4 and the second optical sub-module 5 may have grooves and protrusions, respectively. In brief, as long as the second housing and the optical sub-module form a snap-connection, a flexible setting can be made as required.

Further, the first optical sub-module 4, the second optical sub-module 5, the first boss 41, the second boss 51, the third boss 54, and the fourth boss 52 may be rectangular. The openings in the housing corresponding to these bosses may also be rectangular.

In the embodiments of the present disclosure, the shape of the optical sub-module is set to a rectangle. Comparing with the optical sub-module in other shapes, the rectangular boss provided on the rectangular optical sub-module leads to the largest contact area with the optical sub-module and the largest heat dissipation area.

In addition, the above-mentioned bosses and the openings may be other shapes, such as circular, elliptical, and the like.

In other embodiments, the thicknesses of the first boss 41 and the second boss 51 are respectively the same as the thickness of the first housing 6, and the thicknesses of the third boss and the fourth boss 52 are respectively the same as the thickness of the second housing 7. The arrangement described above realizes that, when the first boss 41 and the second boss 51 are respectively embedded into the first opening 61 and the second opening 62 of the first housing 6, a continuous surface is formed on the upper surface of the main body of the optical module, and when the third boss and the fourth boss 52 are respectively embedded into the first opening 71 and the second opening 72 of the second housing 7, a continuous surface is formed on the lower surface of the main body of the optical module. Setting the thicknesses of the bosses as described above, may allow the maximum contact area between the bosses and the housing and thus the optimum heat conduction effect. Further, a continuous surface is formed on the upper and lower surfaces of the main body in the optical module, realizing the maximum contact area between the optical module and the external cage and the optimum heat conduction effect.

In further embodiments, the optical module further includes an optical module label placed on the outer side of the first surface of the second housing 7 in the optical module. That is, the optical module label is placed on the lower surface of the main body of the optical module.

In the conventional optical modules, the optical module label is usually placed on the upper surface of the optical module. Since the optical module label is generally made of a material having no thermal conductivity, if the optical module label is placed on the upper surface of the optical module, the contact area between the upper surface of the optical module and the outer cage will be affected and then the heat dissipation performance of the optical module will be affected. However, in the embodiments of the present disclosure, the optical module label is placed on the outer side of the first surface of the second housing in the optical module, namely, the outer side of the lower surface. On the one hand, the upper surface of the optical module can make a full contact with the outer cage, thereby enhancing the heat dissipation efficiency; on the other hand, the lower surface where the optical module label is located is the area with less generated heat in the entire optical module, thus, such a setting of the optical module label will less affect the heat dissipation. Therefore, as a whole, it is possible to enhance the heat conduction efficiency of the optical module by placing the optical module label on the outer side of the first surface of the second housing in the optical module.

Figure 10:
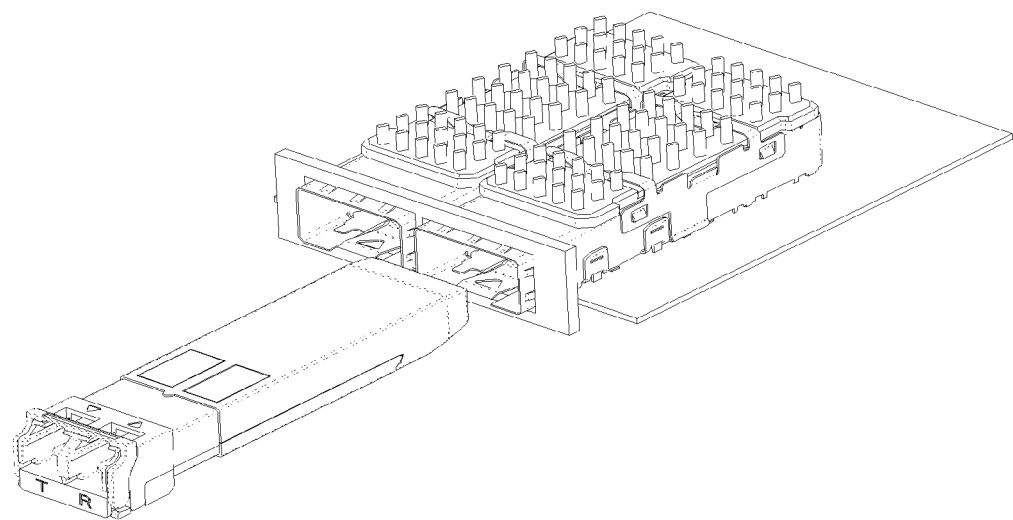
FIG. 10 is a view of a combination of an optical module and an external cage provided in an embodiment of the present disclosure.

FIG. 10 is a view of a combination of an optical module and an external cage provided in the embodiments of the present disclosure. The optical module of FIG. 7 is taken as an example, as shown in FIG. 10, the upper and lower surfaces of the main body of the optical module are provided with openings. Upon being inserted into the external cage, the heat generated by optical sub-module is transferred to the upper and lower surfaces of the main body of the structure through the bosses embedded into the openings. The upper surface of the external cage is also provided with openings with heat sinks and conducting strips arranged above. The heat absorbed by the upper and lower surfaces of the main body of the optical module structure is transferred to the heat sink of the cage directly via the conducting strips, without passing through the cage, thereby realizing the rapid heat dissipation of the optical module.

Finally, it should be noted that the above embodiments are merely illustrative of the technical solutions of the present disclosure and are not intended to be construed as limitations thereof. While the present disclosure has been described in detail with reference to the foregoing embodiments, those skilled in the art should understand that the technical solutions described in the foregoing embodiments may be modified or equivalently replaced with some or all of the technical features therein, and that these modifications or substitutions do not obscure the essence of the corresponding technical solutions from falling into the scope of the technical solution of the embodiments of the present disclosure.

What is claimed is:

1. An optical module assembly comprising:
   an optical sub-module having a longitudinal axis, an opening at a longitudinal end for sending or receiving an optical signal, and a top surface substantially parallel to the longitudinal axis;
   a first boss disposed on the top surface having at least one sidewall and a top surface; and
   a first housing section for partially enclosing the optical sub-module, the first housing section having an inside surface that defines a boss receiving region having a shape that complements the first boss so that the first boss is disposed within the boss receiving region and an inside surface of the boss receiving region is in thermal contact with the at least one sidewall of the first boss to thereby facilitate transfer of heat generated by the optical sub-module to the first housing section.

2. The optical module according to claim 1, wherein the optical sub-module includes a bottom surface and a side surface that vertically connects the top and bottom surfaces, wherein the optical module assembly further comprises:
   a second boss disposed on the bottom surface of the optical sub-module having at least one sidewall and a bottom surface;
   a second housing section for partially enclosing the optical sub-module, the second housing section including an inside surface that defines a boss receiving region having a shape that complements the second boss so that the second boss is disposed within the boss receiving region of the second housing and an inside surface of the boss receiving region is in thermal contact with the second boss to thereby facilitate transfer of heat generated by the optical sub-module to the second housing section;

wherein the interior surface of the second housing section is configured to be snap-connected to the side surface of the optical sub-module, and wherein the interior surface of the second housing section is vertically connected with the interior surface of the second housing section.

3. The optical module according to claim 2, wherein one of the interior surface of the second housing and the third surface of the optical sub-module is provided with a groove, and the other is provided with a protrusion matching with the groove to facilitate the snap-connection between the interior surface of the second housing and the side surface of the optical sub-module.

4. The optical module according to claim 1, wherein the optical sub-module, the first boss and the second boss are rectangular.

5. An optical module assembly, comprising:
a first optical sub module having a longitudinal axis, an opening at a longitudinal end for sending or receiving an optical signal, and a top surface substantially parallel to the longitudinal axis;
a second optical sub-module having a longitudinal axis, an opening at a longitudinal end for sending or receiving an optical signal, and a top surface substantially parallel to the longitudinal axis;
a first boss disposed on the top surface of the first optical sub-module having at least one sidewall and a top surface;
a second boss disposed on the top surface of the second optical sub module having at least one sidewall and a top surface;
a first housing section for partially enclosing the first and second optical sub-module,
the first housing having an inside surface that defines boss receiving regions having shapes that complement the first and second bosses, respectively, so that the first and second bosses are disposed within respective boss receiving regions and inside surfaces of the boss receiving regions are in thermal contact with the at least one sidewalls of the first and second bosses, respectively, to thereby facilitate transfer of heat generated by the first and second optical sub-modules to the first housing section; and
wherein the first optical sub-module and the second optical sub-module are configured to be snap-connected together.

6. The optical module according to claim 5, wherein a side surface of one of the first optical sub-module and the the second optical sub-module is provided with a groove and the other side surface is provided with a protrusion to facilitate the snap-connection between the first optical sub-module and the second optical sub-module.

7. The optical module according to claim 5, wherein first and second optical sub-modules include bottom surfaces and side surfaces that vertically connect respective the top and bottom surfaces of the first and second optical sub-modules, wherein the optical module assembly further comprises:
third and fourth bosses disposed on the bottom surfaces of the first and second optical sub-modules, respectively, the third and fourth bosses each having at least one sidewall and a bottom surface;
a second housing section for partially enclosing the first and second optical sub-modules, the second housing section including an interior surface that defines boss receiving regions having shapes that complement the third and fourth bosses so that the third and fourth bosses are disposed within respective boss receiving regions and inside surfaces of the boss receiving regions are in thermal contact with the at least one sidewalls of the third and fourth bosses, respectively to thereby facilitate transfer of heat generated by the first and second optical sub-module to the second housing section;
wherein the interior surface of the second housing is configured to be snap-connected to the side surface of the first optical sub-module and the side surface of the second optical sub-module.

8. The optical module according to the claim 7, wherein the interior surface of the second housing is provided with grooves and the side surfaces of the first and second optical sub modules are provided with protrusions matching with the grooves, or vice versa, to facilitate the snap-connection between the interior surface of the second housing and the first and second optical sub-modules.

9. The optical module according to claim 7, wherein the first optical sub-module, the second optical sub-module, the first boss, the second boss, the third boss and the fourth boss are rectangular.

10. The optical module according to claim 9, wherein thicknesses of the first boss and the second boss are match a thickness of the first housing, and thicknesses of the third boss and the fourth boss match a thickness of the second housing.

11. The optical module according to claim 1, wherein the optical sub-module is a transmitting optical sub-assembly (TOSA).

12. The optical module according to claim 1, wherein the boss receiving region corresponds to a blind opening having an interior surface that contacts the top surface of first boss such that the top surface of the first boss transfers heat generated by the optical sub-module to the first housing.

13. The optical module according to claim 1, wherein the boss receiving region corresponds to a through opening such that the top surface of the first boss transfers heat generated by the optical sub-module to air.

14. The optical module according to claim 1, wherein an area of the first boss is larger than an area of other portions on the top surface except for the first boss.

15. The optical module according to claim 5, wherein the first optical sub-module and the second optical sub-module correspond to a transmitting optical sub-assembly (TOSA) and a receiving optical sub-assembly (ROSA), respectively.

16. The optical module according to claim 5, wherein the first opening of the first housing corresponds to a blind opening having an interior surface that contacts the top surface of first boss such that the top surface of the first boss transfers heat generated by the first optical sub-module to the first housing.

17. The optical module according to claim 5, wherein the first opening corresponds to a through opening such that the top surface of the first boss transfers heat generated by the optical sub-module to air.

18. The optical module according to claim 5, wherein the second opening corresponds to a blind opening having an interior surface that contacts the top surface of second boss such that the top surface of the second boss transfers heat generated by the second optical sub-module to the first housing.

19. The optical module according to claim 5, wherein the second opening corresponds to a through opening such that the top surface of the second boss transfers heat generated by the second optical sub-module to air.

20. The optical module according to claim 5, wherein
an area of the first boss is larger than an area of other portions on the top surface of the first optical sub-module except for the first boss; or
an area of the second boss is larger than an area of other portions on the top surface of the second optical sub-module except for the second boss.

* * * * *